United States Patent
Mehta et al.

(10) Patent No.: US 9,115,279 B2
(45) Date of Patent: Aug. 25, 2015

(54) POLYPROPYLENE COMPOUNDS WITH HIGH IMPACT PERFORMANCE AND IMPROVED STRESS WHITENING RESISTANCE

(71) Applicant: Asahi Kasei Plastics North America, Inc., Fowlerville, MI (US)

(72) Inventors: Sameer G Mehta, Novi, MI (US); Michael James Balow, Brighton, MI (US); Vaibhav Vishnu Apte, Farmington Hills, MI (US); Laura Therese Shereda, Fowlerville, MI (US)

(73) Assignee: ASAHI KASEI PLASTICS NORTH AMERICA, INC., Fowlerville, MI (US)

( * ) Notice: Subject to any disclaimer, the term of this patent is extended or adjusted under 35 U.S.C. 154(b) by 0 days.

(21) Appl. No.: 14/218,443

(22) Filed: Mar. 18, 2014

(65) Prior Publication Data

US 2014/0288228 A1    Sep. 25, 2014

Related U.S. Application Data

(60) Provisional application No. 61/788,352, filed on Mar. 15, 2013.

(51) Int. Cl.
| | | |
|---|---|---|
| *C08L 23/14* | (2006.01) | |
| *C08L 23/20* | (2006.01) | |
| *C08L 23/16* | (2006.01) | |

(52) U.S. Cl.
CPC ........... *C08L 23/14* (2013.01); *C08L 2205/025* (2013.01); *C08L 2205/035* (2013.01)

(58) Field of Classification Search
CPC ......... C08L 23/14; C08L 27/08; C08L 23/16; C08L 2205/035; C08L 2205/025; C08L 23/0878; C08L 5/003; C08L 53/02

USPC ............. 525/232, 240, 241, 95, 98; 524/515, 524/525, 526

See application file for complete search history.

(56) References Cited

U.S. PATENT DOCUMENTS

| 4,734,459 | A | 3/1988 | Cecchin et al. |
|---|---|---|---|
| 6,984,688 | B2 | 1/2006 | Gu |
| 7,064,160 | B2 * | 6/2006 | Zanka et al. .................. 524/505 |
| 7,476,710 | B2 | 1/2009 | Mehta et al. |
| 8,173,747 | B2 | 5/2012 | Grein et al. |
| 8,319,102 | B2 | 11/2012 | Grein et al. |
| 2013/0005902 | A1 | 1/2013 | Doshev et al. |

FOREIGN PATENT DOCUMENTS

| EP | 0730003 A1 | 9/1996 |
|---|---|---|
| EP | 1702956 A2 | 9/2006 |
| EP | 1629045 B1 | 5/2007 |
| EP | 2022824 A1 | 2/2009 |
| EP | 1730231 B1 | 6/2012 |
| EP | 2471858 A1 | 7/2012 |
| EP | 2340279 B1 | 3/2013 |
| EP | 2592112 A1 | 5/2013 |
| EP | 1511783 B1 | 7/2013 |
| EP | 2639268 A1 | 9/2013 |
| GB | 1359740 | 7/1974 |
| WO | WO 03/006042 A1 | 1/2003 |
| WO | WO 2010/034684 A3 | 4/2010 |
| WO | WO 2013/004804 A1 | 1/2013 |
| WO | WO 2013/127760 A1 | 9/2013 |

* cited by examiner

*Primary Examiner* — Nathan M Nutter
(74) *Attorney, Agent, or Firm* — Birch, Stewart, Kolasch & Birch, LLP

(57) ABSTRACT

The present invention relates to polypropylene compositions with a balance of high strength, good clarity, excellent stress whitening resistance, and excellent impact properties—especially at low temperatures—for use in demanding plastics applications. Blends consist of both homopolymer and random copolymer polypropylene fractions, as well as propylene-ethylene elastomers and styrenic based elastomers. The invention also covers molded articles made from these blends.

22 Claims, No Drawings

POLYPROPYLENE COMPOUNDS WITH HIGH IMPACT PERFORMANCE AND IMPROVED STRESS WHITENING RESISTANCE

PRIORITY CLAIM

This application claims the benefit of U.S. provisional Application No. 61/788,352 filed on Mar. 15, 2013, which is incorporated by reference herein.

FIELD OF THE INVENTION

This invention relates to polymer compositions with a balance of strength, good clarity, high impact resistance—especially at low temperatures, and superior stress whitening resistance. The present invention also includes articles made therefrom, including molded articles.

BACKGROUND

Polypropylene compositions are widely used in the plastics industry. Polypropylene compositions can be processed to form molded bodies with unique shapes and advantageous mechanical properties including high hardness, stiffness, and stability. Consumer articles including automotive parts, toys, containers, or household goods are often produced. However, such formulations are often excluded from applications with more demanding specifications due to inadequate properties—most notably poor low-temperature impact. Propylene compositions with a) high stiffness b) good clarity c) resistance to stress whitening and d) excellent low temperature impact properties are required. This is difficult to achieve because enhancement of one property generally comes at the expense of another property.

In the art, highly crystalline polypropylene is generally used to attain very stiff and tough materials with excellent mechanical properties. However, high crystallinity significantly increases the haze and worsens optical properties. Addition of higher amounts of comonomer would mean reduced crystallinity and lower haze but also decreased stiffness. The balance of components must be very carefully planned to get a desired result.

It is also well known in the art that the addition of an elastomeric phase to a polypropylene matrix will improve the impact properties of the composition. However, the types of rubber that may be used without affecting the favorable properties of the matrix are limited. While incorporating an elastomer will improve impact properties, stress whitening and opacity will often worsen.

U.S. Pat. No. 4,734,459 discloses an inventive compound of polypropylene elastomer material with good stress whitening resistance. EP 0,730,003 shows that whitening resistance in U.S. Pat. No. 4,734,459 can be further improved by changing an ethylene-propylene rubber to an ethylene-butene rubber, which reinforces the importance of elastomer selection.

EP 2,340,279 and EP 2,471,858 disclose compositions of polypropylene blends that are resistant against stress whitening and exhibit improved clarity in articles molded therefrom.

Patents EP 1,730,231, EP 1,702,956, and U.S. Pat. No. 8,173,747 each disclose inventive compounds with excellent transparency, good stress whitening, and improved impact properties. Molded articles produced from these compositions are used in applications requiring thin, flexible films. However, materials with high stiffness remain elusive.

U.S. Pat. No. 7,476,710 describes a material possessing the closest properties to the elusive balance of stiffness, whitening, impact, and clarity, which are required for demanding applications. U.S. Pat. No. 7,476,710 describes a molded article comprising a heterogeneous blend comprising: (1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 200 dg/min or less (preferably 1 to 100 dg/min or less); and (2) from 1 to 40 weight % of one or more semi-amorphous polymers (based upon the weight of the semi-crystalline and semi-amorphous polymers), each semi-amorphous polymer comprising propylene and from 10 to 25 weight % of one or more C2 and/or C4 to C10 alpha-olefin comonomers, said semi-amorphous polymers each having:

a) a heat of fusion of 4 to 70 J/g; and
    b) a melt flow rate of 0.1 to 200 dg/min (preferably 1 to 100 dg/min or less); and
    c) an intermolecular compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer;
    d) an Mw/Mn of 1.5 to 4, and
    e) a propylene triad tacticity, as measured by $^{13}$C NMR, of 75% or greater, where the blend has:
        i) a melt flow rate of 0.5 to 200 dg/min (preferably 1 to 100 dg/min); and
        ii) less than 5 weight % filler, based upon the weight of the polymers and the filler; and
        iii) a permanent set of greater than 65%; and
        iv) a haze of 20% or less on a 1 mm injection molded chip; and the molded part has:
            a) a thickness of 250 μm to 10 mm; and
            b) a notched Izod impact strength at 23° C. of 80 J/m (1.5 ft·lb/in) or more; and
            c) a notched Izod impact strength at 0° C. of 27 J/m (0.5 ft·lb/in) or more; and
            d) a 1% secant flexural modulus of 150,000 psi (1035 MPa) or lower
            e) an ultimate elongation where greater than 50% of 5 test specimens suffer no break through extension to 1000%; and
            f) a resistance to stress whitening of Hunter color ΔL of 15 or lower, measured on a 0.125 in (3.18 mm) thick injection molded pad.

The properties of the molded articles described above are an improvement to its predecessors. However, an even better balance of impact, stress whitening resistance, haze, and strength must be achieved to expand polypropylene use into the most demanding plastic applications. Most importantly, molded parts should also have low temperature and sub-ambient impact strength and ductility. The current invention fulfills and exceeds these impact requirements, while maintaining a balance of stress whitening, haze, and strength.

SUMMARY

This invention relates to a three phase polypropylene blend and molded articles made therefrom, as well as molded articles made from a heterophasic blend. Surprisingly, the examples demonstrate an excellent balance of strength, transparency, impact properties, and resistance to stress whitening compared to the conventional art.

An embodiment of the invention is a composition comprising a three phase blend of:
a. 30-65% by weight of a polypropylene homopolymer,
b. 30-60% by weight of a polypropylene random copolymer,
c. 10-35% by weight of a styrenic based elastomer (SBE), and
d. 5-25% by weight of a plastomer (PPE).

The PPE may be a metallocene catalyzed propylene rich copolymer of propylene and a $C_2$ or $C_{4-8}$ α-olefin.

The composition may further comprise 0-3% by weight of additives selected from the group consisting of antioxidants, stabilizers, nucleating agents, scratch additives, and colorants.

The plastomer is a polypropylene based elastomer (PPE). The ratio of the polypropylene based elastomer (PPE) to styrenic based elastomer (SBE) may be less than or equal to 1, preferably less than or equal to 0.5.

The styrenic based elastomer (SBE) may be selected from the group consisting of diblock, triblock, and star-block copolymers with an ethylene butane or ethylene propylene ionically polymerized segment. The SBE may be selected from the group consisting of styrenic homopolymers and copolymers, including but not limited to random styrene/diene copolymers and hydrogenated random styrene butadiene copolymers, ethylene/butene copolymers and copolymers including ethylene-styrene interpolymers and styrenic block copolymers, HSEBS, SEBS, and HSEPS.

The composition may have a melt flow rate of 0.5-80 g/10 min at 2.16 kg at 230° C. Melt flow rates were measured according to ISO 1133 (Dec. 1, 2011) at 2.16 kg at 230° C. Units are g/10 minutes.

Another embodiment is directed to a molded article made from a composition comprising a three phase blend of:
a. 30-65% by weight of a polypropylene homopolymer,
b. 30-60% by weight of a polypropylene random copolymer,
c. 10-35% by weight of a styrenic based elastomer (SBE), and
d. 5-25% by weight of a plastomer (PPE).

The molded article may have a tensile strength of greater than 12 MPa. The molded article may have a tensile elongation of greater than 200%. The molded article may have a flexural modulus of greater than 450 MPa. The molded article may have a flexural strength of greater than 17 MPa. The molded article may have a Notched Izod at 23° C. of greater than 10 kJ/m². The molded article may have a Notched Izod at 0° C. of greater than 10 kJ/m². The molded article may have a Notched Izod at −30° C. of greater than 7 kJ/m². The molded article may have a Gardner Impact of greater than 200 in-lb at 23° C. The molded article may have a Gardner Impact of greater than 200 in-lb at 0° C. The molded article may have a Gardner Impact of greater than 200 in-lb at −30° C. The molded article may have a ΔL of less than 15.

Another embodiment is directed to a molded article made from a composition comprising a heterophasic blend of:
a. 30-65% by weight of a polypropylene homopolymer,
b. 30-60% by weight of a polypropylene random copolymer, and
c. 10-35% by weight is of a styrenic based elastomer (SBE).

The molded article may further comprise 0-3% by weight of additives selected from the group consisting of antioxidants, stabilizers, nucleating agents, scratch additives, and colorants.

The styrenic based elastomer (SBE) may be selected from the group consisting of diblock, triblock, and star-block with an ethylene butene or ethylene propylene ionically polymerized segment. The SBE may be selected from the group consisting of styrenic homopolymers and copolymers, including but not limited to random styrene/diene copolymers and hydrogenated random styrene butadiene copolymers, ethylene/butene copolymers and copolymers including ethylene-styrene interpolymers and styrenic block copolymers, HSEBS, SEBS, and HSEPS.

The molded article may have a melt flow rate of 0.5-80 g/10 min at 2.16 kg at 230° C.

The molded article may have a tensile strength of greater than 12 MPa. The molded article may have a tensile elongation of greater than 200%. The molded article may have a flexural modulus of greater than 450 MPa. The molded article may have a flexural strength of greater than 17 MPa. The molded article may have a Notched Izod at 23° C. of greater than 10 kJ/m². The molded article may have a Notched Izod at 0° C. of greater than 10 kJ/m². The molded article may have a Notched Izod at −30° C. of greater than 7 kJ/m². The molded article may have a Gardner Impact of greater than 200 in-lb at 23° C. The molded article may have a Gardner Impact of greater than 200 in-lb at 0° C. The molded article may have a Gardner Impact of greater than 200 in-lb at −30° C. The molded article may have a ΔL of less than 15.

The balance of properties of the molded articles is preferably a flexural modulus of greater than 450 MPa, a Notched Izod impact at 23° C. and 0° C. of greater than 10 kJ/m², a Notched Izod impact at −30° C. of greater than 7 kJ/m², a Gardner Impact resistance of greater than 200 in-lb at temperatures of 23° C., 0° C., and −30° C., haze on 1 mm discs of less than or equal to 32%, and a stress whitening resistance of ΔL≤10 at an impact of 200 in-lb.

DETAILED DESCRIPTION

For purposes of this invention and the claims thereto, the term copolymer means any polymer comprising two or more monomers. For the purposes of this invention and the claims thereto, when a polymer is referred to as comprising a monomer, the monomer present in the polymer is the polymerized form of the monomer. Likewise when catalyst components are described as comprising neutral stable forms of the components, it is well understood by one of ordinary skill in the art that the active form of the component is the form that reacts with the monomers to produce polymers.

As used herein, the term "polypropylene" refers to homopolymers, copolymers, terpolymers, and interpolymers comprising from 50 to 100 weight % of propylene.

As used herein, "metallocene catalyst system" is the product of contacting components: (1) one or more metallocenes; (2) one or more activators; and (3) optionally, one or more support compositions. Preferred activators include alumoxanes (including methylalumoxane and modified-methylalumoxane), stoichiometric activators, ionic activators, non-coordinating anions and the like.

First Embodiment

In the first embodiment of the invention, a composition comprises a three phase blend. The three phase blend comprises a matrix phase, comprised of both the polypropylene homopolymer and polypropylene random copolymer, and dispersed phases of a styrenic based elastomer (SBE) and a plastomer (PPE).

Polypropylene Homopolymer

The polypropylene homopolymer comprises 30-65% by weight of the total composition. The polypropylene homopolymer preferably comprises 30-45%.

The polypropylene homopolymer preferably has a melting point of greater than 152° C., and a xylene insoluble content of greater than or equal to 95%, and a melt flow rate (MFR) of 1-80 g/10 minutes at 2.16 kg at 230° C. Xylene soluble level is determined by ISO 16152 Plastics—Determination of Xylene Solubles of Polypropylene Available from American National Standards Institute (ANSI).

More specific examples of the polypropylene homopolymer include Formosa Formolene 4100T, Formosa Formolene 1102KR, and Ineos H00-G00.

Polypropylene Random Copolymer

The polypropylene random copolymer is a copolymer of polypropylene and an alpha-olefin. The alpha-olefin may be ethylene, butene, pentene, hexene, heptane, or octene. The type of alpha olefin may be $C_2$-$C_8$ alpha-olefin, with the exception of $C_3$. The alpha-olefin is preferably ethylene, butene, hexene, or octene, more preferably $C_2$ or $C_4$ alpha-olefin, and most preferably a $C_2$ (ethylene) alpha-olefin. The polypropylene random copolymer may be 0.25-5% alpha-olefin and preferably 2-5% alpha-olefin.

The polypropylene random copolymer comprises 30-60% by weight of the total composition. The polypropylene random copolymer preferably comprises 40-60% of the total composition.

Preferred polypropylene random copolymers have a melting point (Tm-second melt as measured by DSC as described above) between 100 and 170° C., preferably between 110 and 170° C., more preferably between 125 and 170° C.

Preferred polypropylene random copolymers have a melt flow rate from 1-80 g/10 min, preferably 0.5-40 g/10 min according to ISO 1133, at 2.16 kg, 230° C.

Preferred polypropylene random copolymers have a 1° Secant Flexural Modulus from 690 to 1725 MPa, preferably from 1000 to 1720 MPa measured according to ISO 178. Highly crystalline polypropylene homopolymers with a flexural modulus above 1725 MPa may also be used; however, other desired properties will be affected.

Suitable examples include polymers produced by metallocene systems. The polymers may be produced by any means including solution, slurry, gas phase, supercritical or high pressure.

In another embodiment preferred polypropylene random copolymers useful herein have a melting point greater than 110° C., preferably greater than 115° C., and most preferably greater than 130° C. and a heat of fusion of greater than 60 J/g, preferably at least 70 J/g, more preferably at least 80 J/g, as determined by DSC analysis Examples of the polypropylene random copolymer include Braskem PP RP250 and LyondellBasell Profax SR256M.

Styrenic Based Elastomer (SBE)

The amount of styrenic based elastomer may be 10-30% of the total composition, preferably greater than or equal to 20%. The SBE may be a diblock, triblock or, star-block with an ethylene butene or ethylene propylene ionically polymerized segment. The SBE may be styrenic homopolymers and copolymers, including but not limited to random styrene/diene copolymers and hydrogenated random styrene butadiene copolymers, ethylene/butene copolymers and copolymers including ethylene/styrene interpolymers and styrenic block copolymers, HSEBS, SEBS, and HSEPS.

Three specific examples of suitable styrenic based elastomers are Kraton G1652M, Septon 8006, and Septon 8007.

Plastomer (PPE)

The amount of polypropylene based elastomer (PPE) may be 5-25%, preferably 5-15% by weight of the total composition. The preferred propylene rich elastomer should be selected from a composition containing 65-90% propylene and have a comonomer content from 10-35% by weight selected from ethylene ($C_2$) or $C_4$-$C_{10}$ alpha olefin monomers. The preferred propylene range of the elastomer is greater than 75% $C_3$ and the preferred comonomer is $C_2$.

The PPE may have a melt flow rate from 2 to 25 g/10 min, a density of 0.863 to 0.891 g/cm$^3$, a glass transition temperature of −15 to −35° C., a melting range of 50 to 120° C., a shore A hardness of 70 to 95, and/or a flexural modulus of 25 to 400 MPa.

Example of suitable plastomers include Dow Versify 4301 and VISTOMAXX 3000.

Additives

Further, a variety of additives may be incorporated into the embodiments described above used to increase processability or enhance properties of the final molded parts. Such additives include, for example, stabilizers, antioxidants, fillers, colorants, and antiblock agents. Primary and secondary antioxidants include, for example, hindered phenols, hindered amines, and phosphites. Also, other nucleating agents may also be employed. Additives such as dispersing agents, can also be included. Catalyst deactivators are also commonly used, for example, calcium stearate, hydrotalcite, calcium oxide, or other acid neutralizers known in the art.

Other additives include phenolic antioxidants such as Ciba Irganox 1010, phosphite antioxidants such as Irganox 1076, trisaryl phosphite processing stabilizers such as Ciba Irgafos 168, calcium stearate such as Corporacion Sierra Madre TEX-K98, ethylene distearamides such as Lonza Arcawax C Lubricant, nucleating agents such as Amfine Chemical Corporation ADK Stabilizer NA-902, and polypropylene flakes such as Equistar Chemicals Profax 6301.

Three Phase Blend

The components above make up a three phase blend with the polypropylene homopolymer and the polypropylene random copolymer forming a matrix phase and the styrenic based elastomer and the plastomer each acting as a dispersed phase.

In a preferred embodiment, the matrix phase described herein is heterogeneous, characterized by a fine dispersion of discontinuous phases uniformly distributed in the matrix. The dimensions of the discontinuous phases in an article depend on the product composition and on the fabricating mode used to prepare the article. For example, injection molding will introduce orientation along the flow direction causing some elongation of the dispersed phase particles.

The matrix phase of the present invention can be prepared by any procedure that causes the intimate admixture of the components. This may include, but is not limited to, reactor blends or blends prepared by post-reactor mixing of the polypropylene random copolymer and polypropylene homopolymer components. For example, they may be blended in a tumbler, static mixer, batch mixer, extruder, or a combination thereof. The mixing step may take place as part of a processing method used to fabricate articles, such as in the extruder on an injection molding, machining, or fiber line.

In a preferred embodiment, the matrix phase has dispersions of a second and third phase of elastomeric components less than 4 µm in size in a continuous phase of semi-crystalline polymer, preferably are 3 µm or less, and most preferably 2 µm or less in size. (By dispersions less than 4 µm in size is meant that the average particle size is 4 µm or less.)

The three phase blend may have a melt flow of 0.5-80 g/10 min at 2.16 kg at 230° C. The three phase blend will preferably have a melt flow rate of 0.5-40 g/10 min, and most preferably a melt flow rate of 0.5-25 g/10 min.

The ratio of plastomer or polypropylene based elastomer (PPE) to styrenic based elastomer may be less than or equal to 1, preferably less than or equal to 0.5.

Second Embodiment

In the second embodiment of the invention, a composition comprises a heterophasic blend. The heterophasic blend comprises polypropylene homopolymer, polypropylene random copolymer, and a styrenic based elastomer (SBE).

Heterophasic Blend

The components above make up a heterophasic blend with the polypropylene homopolymer and the polypropylene random copolymer forming a matrix phase and the styrenic based elastomer acting as a dispersed phase.

In a preferred embodiment, the matrix phase described herein is heterogeneous, characterized by a fine dispersion of a discontinuous phase uniformly distributed in the matrix. The dimensions of the discontinuous phase in an article depend on the product composition and on the fabricating mode used to prepare the article. For example, injection molding will introduce orientation along the flow direction causing some elongation of the dispersed phase particles.

In a preferred embodiment, the matrix phase is a heterogeneous blend, preferably where the polypropylene random copolymer is the continuous phase, and the polypropylene homopolymer is the discontinuous phase.

Molded Articles Made from the Three Phase Blend or the Heterophasic Blend

The inventive compositions disclosed above can be produced in a batch or continuous mixing operation. Extruders having a variety of screw configurations such as a single screw or a twin screw configuration can be used to produce these compounds. Twin screw extruders can have either a co-rotating or counter-rotating screw. It is preferred to use a co-rotating twin screw extruder such as is commercially available from Coperion with headquarters in Stuggart, Germany.

Extruders have various barrel heating zones and other processing parameters that interact with the screw elements to produce a compounded material. The zones are roughly equal in dimensions and are numbered sequentially so that the highest number is closest to the extruding die. The Zone 1-4 Temperature may be 340-490° F., preferably 350-420° F., and more preferably 360° F. The Zone 5-8 Temperature may be 340-490° F., preferably 350-420° F., and more preferably 360° F. The Die Temperature may be 380-490° F., preferably 380-440° F., and more preferably 400° F. The screw rotation may be 300-1000 rpm, preferably 300-600 rpm, and more preferably 400 rpm. The torque may be 30-95%, preferably 50-85%, and more preferably 70%.

Typically, the output of the extruder is strands that are pelletized for subsequent extrusion or injection molding to produce finished articles and test specimens.

The molded article may vary in thickness depending on the intended application. However, parts of a thickness greater than 254 μm (0.010 inches) up to 5 cm are usually suitable, preferably the molded article has a thickness of 750 μm to 1 cm, more preferably 1200 μm to 5 mm, even more preferably 2500 μm to 3 mm. Molded articles intended for packaging are usually from 254 μm to 1 cm thick.

In this invention, the term "molded article" describes an article made by a molding process. Possible molding processes include blow molding, injection molding, injection stretch molding, thermoforming, profile extrusion, etc. Other examples include gas-assisted injection molding, extrusion blow molding, injection blow molding, injection stretch blow molding, compression molding, rotational molding, foam molding, sheet extrusion, and profile extrusion. The molding processes are well known to one of ordinary skill in the art.

The compositions described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

It will be understood by one of ordinary skill in the art that the steps outlined above may be varied, depending upon the desired result. For example, the extruded sheet of the compositions of this invention may be directly thermoformed or blow molded without cooling, thus skipping a cooling step. Other parameters may be varied as well in order to achieve a finished composite article having desirable features.

Preferred articles made using the blends of this invention include furniture, cookware, storageware, toys, medical devices, medical containers, healthcare items, sheets, crates, containers, bottles, packaging, wire and cable jacketing, pipes, sporting equipment, chair mats, tubing, profiles, boat and water craft components, and automotive components such as interior parts, pillars, seating, and consoles.

As referenced in the background, many highly flexible materials with excellent impact, haze, and stress whitening resistance have been developed. However, when the additional requirement of strength or stiffness is added, a whole new challenge is created. Generally, strength is associated with high concentrations of homopolymer as opposed to copolymer and minimal elastomer content. However, such compositions are not associated with good impact properties or desirable optical properties. Surprisingly, this invention contains several formulations that have a desirable balance of all four criteria.

EXAMPLES

The following examples illustrate the present invention. It is understood that these examples are given for the purpose of illustration and do not limit the invention. In the examples, all parts and percentages are by weight based on the total weight of the composition unless otherwise specified.

Example 1

A composition comprising a heterophasic blend was prepared by melt mixing 40 wt % Formosa Formolene 1102KR as the polypropylene homopolymer, 49.5 wt % Braskem RP 250 as the random copolymer, 10.0 wt % Kraton G1651 as the styrenic elastomer, 0.25% Irganox 1010 phenolic antioxidant, 0.125% Irganox 1076 phosphite antioxidant, 0.125% calcium stearate, 0.125% Acrawax C Lubricant, and 0.375% polypropylene flakes using a 12 barrel twin-screw extruder with a 26 mm screw diameter. The composition was made with barrel temperatures of about 200° C. and strand pelletized.

The composition was then formed into a molded article for testing. The composition was injection molded using standard ISO molds for tensile bars, plaques, and other test specimens. Gardner discs (2 inch diameter, 3.18 mm thickness) were produced according to ASTM D5420 requirements. The molding was done on a 90 Ton Toshiba Press (Model No. 15690) using ASTM molding conditions for unfilled polypropylene. To assess transparency, haze chips (2 inch diameter, 1 mm thickness) were molded on a press by Standard Plaque (Melvindale, Mich.).

Example 2

A composition comprising a heterophasic blend was prepared by the same method as in Example 1 except the amount of Formosa Formolene 1102KR was changed to 30 wt %, the amount of Braskem RP 250 was changed to 44.5 wt %, and the amount of Kraton G1651 was changed to 25.0 wt %.

The composition was then formed into a molded article for testing as set forth in Example 1.

Example 3

A composition comprising a three phase blend was prepared by melt mixing 40 wt % Formosa Formolene 1102KR as the polypropylene homopolymer, 44.5 wt % Braskem RP 250 as the random copolymer, 10.0 wt % DOW Versify 4301 as the polypropylene elastomer, 15.0 wt % Kraton G1651 as the styrenic elastomer, 0.25% Irganox 1010 phenolic antioxidant, 0.125% Irganox 1076 phosphite antioxidant, 0.125% calcium stearate, 0.125% Acrawax C Lubricant, and 0.375% polypropylene flakes using a 12 barrel twin-screw extruder with a 26 mm screw diameter. The composition was made with barrel temperatures of about 200° C. and strand pelletized.

The composition was then formed into a molded article for testing as set forth in Example 1.

Example 4

A composition comprising a three phase blend was prepared by the same method as in Example 3 except the amount of DOW Versify 4301 was changed to 6.0 wt % and the amount of Kraton G1651 was changed to 19.0 wt %.

The composition was then formed into a molded article for testing as set forth in Example 1.

Example 5

A composition comprising a heterophasic blend was prepared by the same method as in Example 1 except the amount of Formosa Formolene 1102KR was changed to 30 wt %, the amount of Braskem RP 250 was changed to 34.5 wt %, and the amount of Kraton G1651 was changed to 35.0 wt %.

The composition was then formed into a molded article for testing as set forth in Example 1.

Example 6

A composition comprising a three phase blend was prepared by the same method as in Example 3 except the amount of Braskem RP 250 was changed to 34.5 wt % and the amount of Kraton G1651 was changed to 25.0 wt %.

The composition was then formed into a molded article for testing as set forth in Example 1.

Comparative Example 1

A composition was prepared by the same method as in Example 3 except the amount of Formosa Formolene 1102KR was changed to 40 wt %, the amount of Braskem RP 250 was changed to 49.5 wt %, and Kraton G1651 was not added.

The composition was then formed into a molded article for testing as set forth in Example 1.

Comparative Example 2

A composition was prepared by the same method as in Example 3 except the amount of Formosa Formolene 1102KR was changed to 40 wt %, the amount of Braskem RP 250 was changed to 49.5 wt %, the amount of DOW Versify 4301 was changed to 5.0 wt %, and the amount of Kraton G1651 was changed to 5.0 wt %.

The composition was then formed into a molded article for testing as set forth in Example 1.

Comparative Example 3

A composition was prepared by the same method as in Example 3 except the amount of DOW Versify 4301 was changed to 25.0 wt % and Kraton G1651 was not added.

The composition was then formed into a molded article for testing as set forth in Example 1.

Comparative Example 4

A composition was prepared by the same method as in Example 3 except the amount of Braskem RP 250 was changed to 34.5 wt %, the amount of DOW Versify 4301 was changed to 25.0 wt %, and the amount of Kraton G1651 was changed to 10.0 wt %.

The composition was then formed into a molded article for testing as set forth in Example 1.

Comparative Example 5

A composition was prepared by melt mixing 100 wt % Braskem RP 250 as the random copolymer using a 12 barrel twin-screw extruder with a 26 mm screw diameter. The composition was made with barrel temperatures of about 200° C. and strand pelletized.

The composition was then formed into a molded article for testing as set forth in Example 1.

Comparative Example 6

A composition was prepared by melt mixing 50 wt % Formosa Formolene 1102KR as the polypropylene homopolymer and 50 wt % Braskem RP 250 as the random copolymer using a 12 barrel twin-screw extruder with a 26 mm screw diameter. The composition was made with barrel temperatures of about 200° C. and strand pelletized.

The composition was then formed into a molded article for testing as set forth in Example 1.

Comparative Example 7

A composition was prepared by melt mixing 100 wt % Exxon Achieve PP7032E2 using a 12 barrel twin-screw extruder with a 26 mm screw diameter. The composition was made with barrel temperatures of about 200° C. and strand pelletized.

The composition was then formed into a molded article for testing as set forth in Example 1.

Methods for Measuring the Properties

Strength

The strength of the compositions is defined by the tensile strength, tensile elongation at break, flexural modulus, and flexural strength.

Tensile strength and elongation were measured according to ISO 527 (Feb. 15, 2012) with a speed of 5 mm/min using an extensometer.

Flexural modulus and flexural strength were determined using ISO 178 (Dec. 15, 2011 (4$^{th}$ Edition)) on injection molded tensile bars.

Haze

In the compounds studied, transparency is generally governed by the amount of crystallinity (i.e., amount of homopolymer) in each material. Haze gets worse with an increase in homopolymer content, but stiffness increases. According to ASTM D1003, a haze value ≥30% is considered diffuse.

Haze was measured according to ASTM D1003 (Nov. 1, 2007) on injection molded plaques 1 mm in thickness.

Impact

Notched Izod impact and Gardner impact were measured for each composition at temperatures of 23° C., 0° C., and −30° C.

Notched Izod testing was performed according to ISO 180 (Dec. 15, 2000) at temperatures of 23° C., 0° C., and −30° C.

Gardner Impact testing was performed using ASTM D5420 (Jul. 1, 2010) at temperatures of 23° C., 0° C., and −30° C.

Tables 1 and 2 below provide the formulations of the inventive Examples and the Comparative Examples.

TABLE 1

Three-phase blends containing polypropylene and styrenic elastomer

|  |  | CE1 | CE2 | CE3 | IE3 | IE4 | IE6 | CE4 |
|---|---|---|---|---|---|---|---|---|
| Polypropylene Homopolymer | % | 40 | 40 | 30 | 30 | 30 | 30 | 30 |
| Random Copolymer | % | 49.5 | 49.5 | 44.5 | 44.5 | 44.5 | 34.5 | 34.5 |
| Polypropylene Elastomer | % | 10.0 | 5.0 | 25.0 | 10.0 | 6.0 | 10.0 | 25.0 |
| Styrenic Elastomer | % | — | 5.0 | — | 15.0 | 19.0 | 25.0 | 10.0 |

TABLE 2

Compositions of heterophasic blends and control samples

|  |  | IE1 | IE2 | IE5 | CE5 | CE6 | CE7 |
|---|---|---|---|---|---|---|---|
| Polypropylene Homopolymer | % | 40 | 30 | 30 | — | 50 | — |
| Random Copolymer | % | 49.5 | 44.5 | 34.5 | 100 | 50 | — |
| Polypropylene Elastomer | % | — | — | — | — | — | — |
| Styrenic Elastomer | % | 10.0 | 25.0 | 35.0 | — | — | — |
| Exxon Achieve PP7032E2 | % | — | — | — | — | — | 100 |

Table 3 provides the properties of the compounds from Table 1. Table 4 provides the properties of the compounds from Table 2.

TABLE 3

Properties of the compounds from Table 1

|  |  | CE1 | CE2 | CE3 | IE3 | IE4 | IE6 | CE4 |
|---|---|---|---|---|---|---|---|---|
| Tensile Strength | MPa | 23 | 23.6 | 17.6 | 19.0 | 18.0 | 15.8 | 15 |
| Tensile elongation at break | % | 200+ | 200+ | 200+ | 200+ | 200+ | 200+ | 200+ |
| Flexural Modulus | MPa | 876 | 929 | 589 | 644 | 686 | 580 | 489 |
| Flexural Strength | MPa | 25.6 | 28.6 | 19.6 | 20.4 | 21.1 | 18.2 | 16.68 |
| Haze (1 mm disc) | % | 40.8 | 39.92 | 22.36 | 35.63 | 31.55 | 30.51 | 41.54 |
| Notched Izod (23° C.) | kJ/m$^2$ | 5 | 6.5 | 9.0 | 48 | 45 | 20 | 47 |
| Notched Izod (0° C.) | kJ/m$^2$ | 1.62 | 1.8 | 2.3 | 2.5 | 2.5 | 58 | 6.7 |
| Notched Izod (−30° C.) | kJ/m$^2$ | 1.63 | 1.6 | 1.9 | 1.3 | 1.5 | 8.4 | 1.7 |
| Gardner Impact (23° C.) | in * lb | 171 | 172 | 230 | 255 | 250 | 217 | 217 |
| Gardner Impact (0° C.) | in * lb | 46 | 114 | 165 | 237 | 247 | 302 | 213 |
| Gardner Impact (−30° C.) | in * lb | S | S | S | 160 | 224 | 232 | 32 |
| ΔL (at 200 in-lb) |  | — | 2.79 | 5.49 | 0.86 | 5.44 | 5.32 | 5.02 | 3.04 |

* S denotes the sample shattered

TABLE 4

Properties of the compounds from Table 2

|  |  | IE1 | IE2 | IE5 | CE5 | CE6 | CE7 |
|---|---|---|---|---|---|---|---|
| Tensile Strength | MPa | 23.9 | 19.0 | 15.7 | 26.0 | 31.0 | 19.7 |
| Tensile elongation at break | % | 200+ | 200+ | 200+ | 40 | 17 | 75 |
| Flexure Modulus | MPa | 1010 | 795 | 656 | 1170 | 1500 | 1139 |
| Flexural Strength | MPa | 29.8 | 23.2 | 19.6 | — | 47 | — |
| Haze | % | 30.81 | 30.21 | 28.83 | Opaque | opaque | opaque |
| Notched Izod (23° C.) | kJ/m$^2$ | 7.5 | 47 | 56 | 10.1 | 4.0 | 60 |
| Notched Izod (0° C.) | kJ/m$^2$ | 1.6 | 4.0 | 58 |  | 2.0 | 60 |
| Notched Izod (−30° C.) | kJ/m$^2$ | 1.4 | 2.0 | 12 | 3.9 | 1.2 | 7.0 |
| Gardner Impact (23° C.) | in * lbf | 256 | 251 | 213 | — | — | — |
| Gardner Impact (0° C.) | in * lbf | 129 | 229 | 311 | — | — | — |
| Gardner Impact (−30° C.) | in * lbf | S | 280 | 272 | — | S | 252 |
| ΔL (at 200 in-lb) |  | — | 1.53 | 7.14 | 5.02 | 19.94 | 17.94 | 25.20 |

* S denotes the sample shattered

Stress Whitening Resistance

Stress whitening—often referred to as blushing or crazing—is caused by microcracks or microcrazes formed on the surface of a molded article upon an impact stress. The material will appear white around the damage areas, which is cosmetically unfavorable. The standard approach to minimize stress-whitening is to use a high ethylene-containing copolymer rubber phase or to add polyethylene to the composition (reference: Polypropylene Handbook, edited by E. P. Moore, Jr., Hanser, 1996). A widely-practiced, commercial route to manufacture blush-resistant impact copolymers is to polymerize some polyethylene (e.g., HDPE) in a tail reactor, following the production of the copolymer rubber component.

Resistance to stress whitening (ΔL), defined as the change in the L value (indicator of lightness/darkness), was tested using a Gardner Impact Tester (model 164) and so-called "Gardner discs" (2 inch diameter, 3.2 mm thick) molded in color 97% of the compound and 3% pigment. The addition of a pigment highlights any stress whitening that occurs as compared to natural colored discs. In the testing, according to ASTM D5420, a disc was placed on top of a ring and an eight pound weight was dropped from a pre-determined height to achieve the desired impact. Impact was calculated by multiplying the weight in pounds of the hammer and the height in inches the weight was dropped from. Samples were taken at various at levels of impact between 8 in-lb and 250 in-lb in order to determine both the maximum level of impact that could be withstood by each composition and the degree of stress whitening at each level of impact.

After allowing impacted samples to sit for 24 hours, color readings were taken on both control (non-impacted) and impacted samples. Color readings were taken on each sample using an Eye 7000A GretagMacbeth set up for illuminant D65/10°—the most commonly used daylight illuminant. Readings were taken with the center of the impact area centered over the reflectance port. L,a,b values were generated for each sample. The difference between the L values of the control samples and the impacted discs represented ΔL, the degree of blushing or crazing, and the likelihood of that specific material to stress whiten. The lower the value of ΔL, the less stress whitening has occurred. In Tables 3 and 4, ΔL is recorded at an impact of 200 in-lb.

From Table 2, Comparative Examples 5-7 represent different polypropylene copolymer compositions. Comparative Example 5 and Comparative Example 7 are traditional heterophasic copolymers. Comparative Example 6 is a mixture of random polypropylene and homopolymer. All these samples show very high levels of haze and unacceptable levels of stress whitening (ΔL). While the impact strength of Comparative Examples 5 and 7 are desirable, the balance of properties is not suitable.

Despite having significant amounts of random copolymer and elastomer, the values for tensile strength, tensile elongation at break, flexural modulus, and flexural strength of the inventive examples are all within the acceptable and preferred range.

The haze values for the inventive examples fall very close to the desired value of less than or equal to 32% while maintaining a good balance of mechanical properties. Clarifier or nucleating agent could be added to reduce haze values.

The inventive examples show much better low temperature impact behavior. This is especially evident at high elastomer contents since PPE/SBE of 2.5, for both 0° C. and −30° C., has unacceptable impact performance compared to PPE/SBE of 0.4. The impact performance of these samples are a significant improvement from the Comparative Examples and the conventional art.

No appreciable stress whitening was detected during Gardner impact testing with impact levels below 200 in-lb at room temperature. Therefore, ΔL data for all three temperatures was reported at an impact value of 200 in-lb for all samples. The resistance to stress whitening shown in these samples is a significant improvement over the conventional art.

In summary, the examples display a novel balance of properties including strength, low temperature impact, clarity, and stress whitening resistance.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable one of ordinary skill in the art to utilize the invention and various embodiments with various modifications as are suited to the particular use contemplated. It is intended that the scope of the invention be defined by the claims appended hereto and their equivalents.

The invention claimed is:

1. A composition comprising a three phase blend of:
   a. 30-65% by weight of a polypropylene homopolymer,
   b. 30-60% by weight of a polypropylene random copolymer,
   c. 10-35% by weight of a styrenic based elastomer (SBE), and
   d. 5-25% by weight of a plastomer (PPE);
      wherein the composition has a haze value at 1 mm of less than or equal to 32% according to ASTM D1003 (Nov. 1, 2007), ΔL of less than 15 at 200 in-lb according to ASTM D5420 (Jul. 1, 2010), and a Gardner Impact of greater than 200 in-lb at 0° C. according to ASTM D5420 (Jul. 1, 2010).

2. The composition of claim 1, wherein the plastomer (PPE) is a copolymer comprising 65-90 wt % propylene and 10-35 wt % $C_2$ or $C_4$-$C_{10}$ alpha olefin monomers.

3. The composition of claim 1, further comprising 0-3% by weight of additives selected from the group consisting of antioxidants, stabilizers, nucleating agents, anti-scratch additives, and colorants.

4. The composition of claim 1, wherein the ratio of the weight of the plastomer (PPE) to the weight of the styrenic based elastomer (SBE) is less than or equal to 1.

5. The composition in claim 1, wherein the styrenic based elastomer (SBE) is selected from the group consisting of a diblock, triblock, and star-block with an ethylene butene or ethylene propylene ionically polymerized segment, styrenic homopolymers, random styrene/diene copolymers, hydrogenated random styrene butadiene copolymers, ethylene/styrene interpolymers, ethylene/butene copolymers, styrenic block copolymers, HSEBS, SEBS, and HSEPS.

6. The composition of claim 1, wherein the melt flow rate is 0.5-80 g/10 min at 2.16 kg at 230° C.

7. A molded article made from a composition comprising a three phase blend of:
   a. 30-65% by weight of a polypropylene homopolymer,
   b. 30-60% by weight of a polypropylene random copolymer,
   c. 10-35% by weight of a styrenic based elastomer (SBE), and
   d. 5-25% by weight of a plastomer (PPE);

wherein the molded article has a haze value at 1 mm of less than or equal to 32% according to ASTM D1003 (Nov. 1, 2007), ΔL of less than 15 at 200 in-lb according to ASTM D5420 (Jul. 1, 2010), and a Gardner Impact of greater than 200 in-lb at 0° C. according to ASTM D5420 (Jul. 1, 2010).

8. The molded article of claim 7 that has at least one of the following properties:
   (i) a tensile strength of greater than 12 MPa;
   (ii) a tensile elongation of greater than 200%;
   (iii) a flexural modulus of greater than 450 MPa; and
   (iv) a flexural strength of greater than 17 MPa.

9. The molded article of claim 7 that has at least one of the following properties:
   (i) a Notched Izod at 0° C. of greater than 10 kJ/m$^2$ according to ISO 180 (Dec. 15, 2000); and
   (ii) a Notched Izod at −30° C. of greater than 7 kJ/m$^2$ according to ISO 180 (Dec. 15, 2000).

10. The molded article of claim 7 that has a Gardner Impact of greater than 200 in-lb at −30° C. according to ASTM D5420 (Jul. 1, 2010).

11. The molded article of claim 7, wherein the plastomer (PPE) is a copolymer comprising 65-90 wt % propylene and 10-35 wt % $C_2$ or $C_4$-$C_{10}$ alpha olefin monomers.

12. The molded article of claim 7, wherein the composition further comprises 0-3% by weight of additives selected from the group consisting of antioxidants, stabilizers, nucleating agents, anti-scratch additives, and colorants.

13. The molded article of claim 7, wherein the ratio of the weight of the plastomer (PPE) to the weight of the styrenic based elastomer (SBE) is less than or equal to 1.

14. The molded article of claim 7, wherein the styrenic based elastomer (SBE) is selected from the group consisting of a diblock, triblock, and star-block with an ethylene butene or ethylene propylene ionically polymerized segment, styrenic homopolymers, random styrene/diene copolymers, hydrogenated random styrene butadiene copolymers, ethylene/styrene interpolymers, ethylene/butene copolymers, styrenic block copolymers, HSEBS, SEBS, and HSEPS.

15. The molded article of claim 7, wherein the melt flow rate of the composition is 0.5-80 g/10 min at 2.16 kg at 230° C.

16. The molded article of claim 11 that has at least one of the following properties:
   (i) a tensile strength of greater than 12 MPa;
   (ii) a tensile elongation of greater than 200%;
   (iii) a flexural modulus of greater than 450 MPa; and
   (iv) a flexural strength of greater than 17 MPa.

17. The molded article of claim 12 that has at least one of the following properties:
   (i) a tensile strength of greater than 12 MPa;
   (ii) a tensile elongation of greater than 200%;
   (iii) a flexural modulus of greater than 450 MPa; and
   (iv) a flexural strength of greater than 17 MPa.

18. The molded article of claim 13 that has at least one of the following properties:
   (i) a tensile strength of greater than 12 MPa;
   (ii) a tensile elongation of greater than 200%;
   (iii) a flexural modulus of greater than 450 MPa; and
   (iv) a flexural strength of greater than 17 MPa.

19. The molded article of claim 14 that has at least one of the following properties:
   (i) a tensile strength of greater than 12 MPa;
   (ii) a tensile elongation of greater than 200%;
   (iii) a flexural modulus of greater than 450 MPa; and
   (iv) a flexural strength of greater than 17 MPa.

20. The molded article of claim 15 that has at least one of the following properties:
   (i) a tensile strength of greater than 12 MPa;
   (ii) a tensile elongation of greater than 200%;
   (iii) a flexural modulus of greater than 450 MPa; and
   (iv) a flexural strength of greater than 17 MPa.

21. The composition of claim 1 in the form of pellets.

22. The molded article of claim 7, in the form of furniture, cookware, storageware, toys, medical devices, medical containers, healthcare items, sheets, crates, containers, bottles, packaging, wire and cable jacketing, pipes, sporting equipment, chair mats, tubing, profiles, boat and water craft components, or automotive components.

* * * * *